US010963824B2

(12) United States Patent
Gurevich et al.

(10) Patent No.: US 10,963,824 B2
(45) Date of Patent: Mar. 30, 2021

(54) ASSOCIATING IDENTIFIERS BASED ON PAIRED DATA SETS

(71) Applicant: Uber Technologies, Inc., San Francisco, CA (US)

(72) Inventors: Maxim Gurevich, San Francisco, CA (US); Mircea Grecu, San Francisco, CA (US); John West, San Francisco, CA (US); Austin Balance, San Franciscco, CA (US); Manas Khadilkar, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 35 days.

(21) Appl. No.: 15/926,133

(22) Filed: Mar. 20, 2018

(65) Prior Publication Data

US 2018/0276580 A1 Sep. 27, 2018

Related U.S. Application Data

(60) Provisional application No. 62/475,804, filed on Mar. 23, 2017.

(51) Int. Cl.
G06Q 10/06 (2012.01)
H04L 29/08 (2006.01)
(Continued)

(52) U.S. Cl.
CPC ... G06Q 10/0631 (2013.01); G06F 16/24578 (2019.01); H04L 67/125 (2013.01);
(Continued)

(58) Field of Classification Search
None
See application file for complete search history.

(56) References Cited

U.S. PATENT DOCUMENTS 6,608,566 B1  8/2003 Davis
6,756,913 B1  6/2004 Ayed
(Continued)

FOREIGN PATENT DOCUMENTS

CN  103856532  6/2014
CN  105575103  5/2016
(Continued)

OTHER PUBLICATIONS

IPRP in PCT/US2018/023887 dated Mar. 19, 2019.
(Continued)

Primary Examiner — Eric W Stamber
Assistant Examiner — Ashley Y Young
(74) Attorney, Agent, or Firm — Mahamedi IP Law LLP

(57) ABSTRACT

A network system can receive, from each of a plurality of devices operated by a respective provider, at least one set of availability data associated with that provider. Each set of availability data includes a start location, an end location, a date, and a start time range. For each set of availability data, the network system can identify a paired data set from a plurality of paired data sets based on the respective start location and the respective end location of that set of availability data, and associate an identifier of the respective provider of that set of availability data with a group associated with the identified paired data set. The network system can receive request data from a computing device of a user, determine one of the plurality of paired data sets, and select a first provider from the group associated with the determined paired data set.

20 Claims, 8 Drawing Sheets

(51) Int. Cl.
*H04W 4/02* (2018.01)
*G06F 16/2457* (2019.01)
*H04L 12/58* (2006.01)

(52) U.S. Cl.
CPC .............. *H04L 67/18* (2013.01); *H04L 67/32* (2013.01); *H04W 4/023* (2013.01); *H04L 51/20* (2013.01)

(56) References Cited

U.S. PATENT DOCUMENTS

| | | |
|---|---|---|
| 6,832,092 B1 | 12/2004 | Suarez |
| 8,412,667 B2 | 4/2013 | Zhang |
| 9,070,101 B2 | 6/2015 | Abhayanker |
| 10,197,410 B2 | 2/2019 | Guo |
| 10,572,964 B2 | 2/2020 | Kim |
| 2003/0058082 A1 | 3/2003 | Mallick |
| 2004/0158483 A1 | 8/2004 | Lecouturier |
| 2005/0227704 A1 | 10/2005 | Ferra |
| 2005/0278063 A1 | 12/2005 | Hersh |
| 2006/0023569 A1 | 2/2006 | Agullo |
| 2006/0034201 A1 | 2/2006 | Umeda |
| 2006/0059023 A1 | 3/2006 | Mashinsky |
| 2006/0155460 A1 | 7/2006 | Raney |
| 2006/0235739 A1 | 10/2006 | Levis |
| 2008/0033633 A1 | 2/2008 | Akiyoshi |
| 2008/0195428 A1 | 8/2008 | O'Sullivan |
| 2008/0270019 A1 | 10/2008 | Anderson |
| 2008/0277183 A1 | 11/2008 | Huang |
| 2009/0083111 A1 | 3/2009 | Carr |
| 2009/0156241 A1 | 6/2009 | Staffaroni |
| 2009/0176508 A1 | 7/2009 | Lubeck |
| 2009/0192851 A1 | 7/2009 | Bishop |
| 2009/0216600 A1 | 8/2009 | Hill |
| 2009/0248587 A1 | 10/2009 | Van Buskirk |
| 2010/0074383 A1 | 3/2010 | Lee |
| 2011/0099040 A1 | 4/2011 | Felt |
| 2011/0153628 A1 | 6/2011 | Lehmann |
| 2011/0238755 A1 | 9/2011 | Khan |
| 2012/0023294 A1 | 1/2012 | Resnick |
| 2012/0041675 A1 | 2/2012 | Juliver |
| 2012/0078672 A1 | 3/2012 | Mohebbi |
| 2012/0203599 A1 | 8/2012 | Choi |
| 2012/0232943 A1 | 9/2012 | Myr |
| 2012/0265580 A1 | 10/2012 | Kobayashi |
| 2012/0290950 A1 | 11/2012 | Rapaport |
| 2013/0073327 A1 | 3/2013 | Edelberg |
| 2013/0110392 A1 | 5/2013 | Kosseifi |
| 2013/0215843 A1 | 8/2013 | Diachina |
| 2014/0074536 A1 | 3/2014 | Meushar |
| 2014/0129302 A1 | 5/2014 | Amin |
| 2014/0149441 A1 | 5/2014 | Wang |
| 2014/0156556 A1 | 6/2014 | Lavian |
| 2014/0378159 A1 | 12/2014 | Dolbakian |
| 2015/0161563 A1 | 6/2015 | Mehrabi |
| 2015/0161564 A1 | 6/2015 | Sweeney |
| 2015/0161698 A1 | 6/2015 | Jones |
| 2015/0206267 A1 | 7/2015 | Khanna |
| 2015/0262430 A1 | 9/2015 | Farrelly |
| 2015/0317568 A1 | 11/2015 | Grasso |
| 2015/0323327 A1 | 11/2015 | Lord |
| 2015/0323331 A1 | 11/2015 | Lord |
| 2015/0323335 A1 | 11/2015 | Lord |
| 2015/0323336 A1 | 11/2015 | Lord |
| 2015/0324717 A1 | 11/2015 | Lord |
| 2015/0324718 A1 | 11/2015 | Lord |
| 2015/0324729 A1 | 11/2015 | Lord |
| 2015/0345951 A1 | 12/2015 | Dutta |
| 2016/0026936 A1 | 1/2016 | Richardson |
| 2016/0027306 A1 | 1/2016 | Lambert |
| 2016/0034845 A1 | 2/2016 | Hiyama |
| 2016/0104122 A1 | 4/2016 | Gorlin |
| 2016/0117610 A1 | 4/2016 | Ikeda |
| 2016/0138928 A1 | 5/2016 | Guo |
| 2016/0334232 A1 | 11/2016 | Zhuang |
| 2016/0356615 A1* | 12/2016 | Arata ................ G01C 21/3438 |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2017/0083832 A1 | 3/2017 | Williams |
| 2017/0308824 A1 | 10/2017 | Lord |
| 2017/0351987 A1 | 12/2017 | Liu |
| 2018/0005145 A1 | 1/2018 | Lo |
| 2018/0091604 A1 | 3/2018 | Yamashita et al. |
| 2018/0101925 A1 | 4/2018 | Brinig et al. |
| 2018/0189717 A1 | 7/2018 | Cao |
| 2018/0211351 A1 | 7/2018 | Kim |
| 2018/0268329 A1 | 9/2018 | Lord |
| 2018/0339714 A1 | 11/2018 | Smid |
| 2018/0356239 A1 | 12/2018 | Marco |
| 2019/0244318 A1 | 8/2019 | Rajcok et al. |
| 2019/0265703 A1 | 8/2019 | Hicok |
| 2020/0211070 A1 | 7/2020 | Singh |
| 2020/0258344 A1 | 8/2020 | Brinig |

FOREIGN PATENT DOCUMENTS

| | | |
|---|---|---|
| DE | 10201607712 | 11/2016 |
| EP | 2293523 | 3/2011 |
| GB | 2367979 | 4/2002 |
| JP | 2002-133592 | 5/2002 |
| JP | 2004-192366 | 7/2004 |
| JP | 2005-107942 | 4/2005 |
| JP | 2006-339810 | 12/2006 |
| JP | 2010-286908 | 12/2010 |
| JP | 2001-188996 | 7/2011 |
| JP | 2012-194687 | 10/2012 |
| JP | 2013-175144 | 9/2013 |
| JP | 2014-238831 | 12/2014 |
| KR | 10-2012-0079549 | 6/2012 |

OTHER PUBLICATIONS

ISR and Written Opinion issued in PCT/US2018/023887 dated Jun. 8, 2018.
ISR/Written Opinion in International Application No. PCT/US2015/046388, dated Nov. 17, 2015.
EESR in EP Application No. 15833693.3 dated Jan. 18, 2018.
Office Action dated Sep. 20, 2018 in EP 15833693.3.
EESR in EP 19165275.9 dated Apr. 18, 2019.
International Search Report and Written Opinion issued in PCT/US2016/062344 dated Jan. 31, 2017.
ISR and Written Opinion in PCT/US2018/017941 dated Apr. 27, 2018.
Furuhata, M., "Ridesharing" The State-of-the-Art and Future Directions, Apr. 15, 2013, Elsevier Ltd., Transportation Research Part B 57, pp. 28-46 (2013).
Huang, Y., Large Scale Real-time Ridesharing with Service Guarantee on Road Networks, Sep. 1-5, 2014, VLDB Endowment, vol. 7, No. 14, pp. 2017-2018 (2014).

* cited by examiner

ASSOCIATING IDENTIFIERS BASED ON PAIRED DATA SETS

RELATED APPLICATIONS

This application claims benefit of priority to Provisional U.S. Patent Application No. 62/475,804, filed Mar. 23, 2017, titled ASSOCIATING IDENTIFIERS BASED ON PAIRED DATA SETS; the aforementioned priority application is hereby incorporated by reference in its entirety.

BACKGROUND

A network service can enable users to request and receive various services through applications on mobile computing devices. The network service typically matches a provider with a user based on a current location of the provider and the specified pickup location of the user.

DETAILED DESCRIPTION

Figure 1:
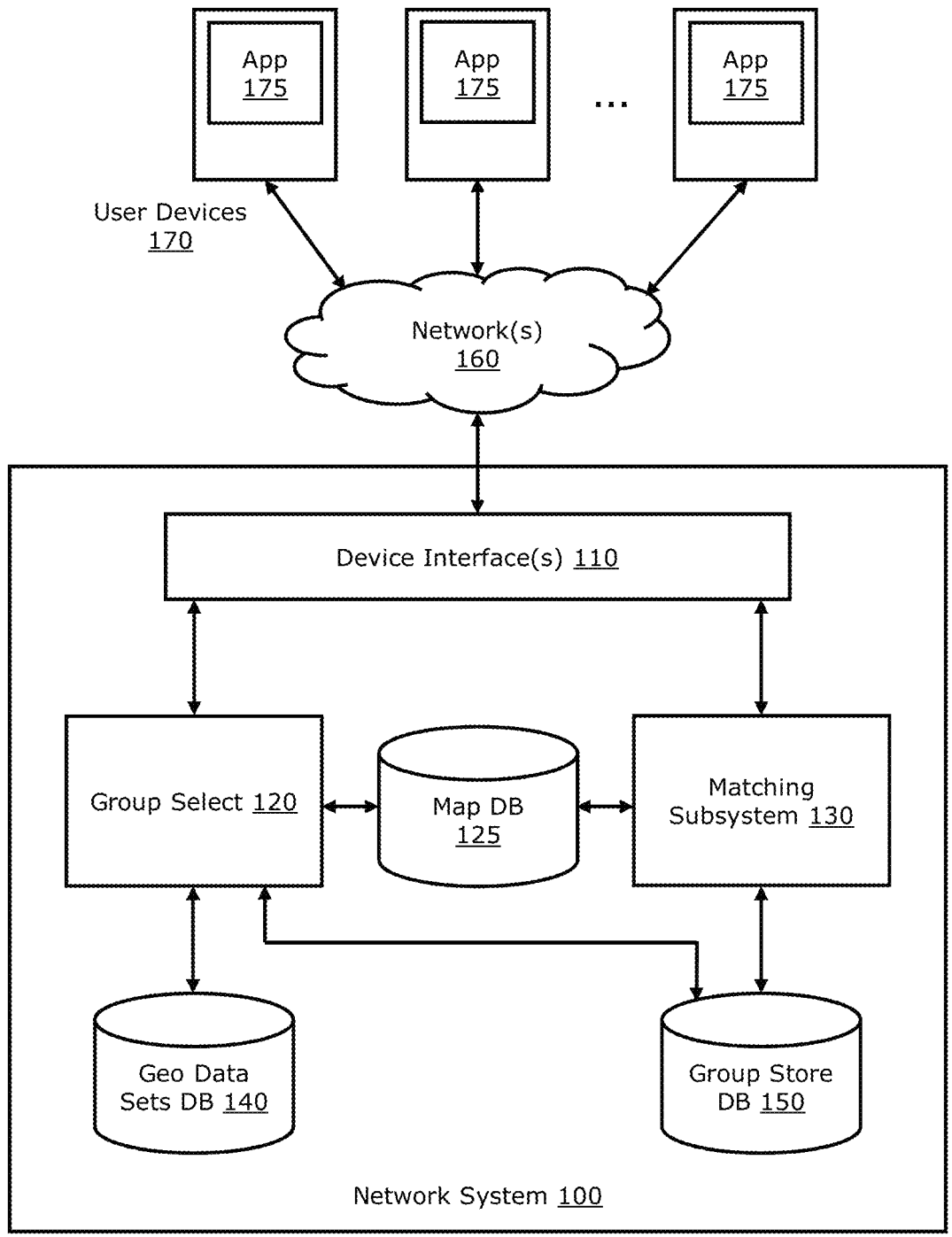
FIG. 1 is a block diagram illustrating an example network computer system in communication with service requester and service provider devices, in accordance with examples described herein.

A network computer system is provided herein that implements a network-based service for matching service providers with service requesters throughout a given region (e.g., a metroplex, such as the San Francisco Bay Area) for purposes of arranging transport services. Examples herein recognize that in some situations, a user may need to travel between cities (not simply within cities) and/or travel long distances (e.g., ten miles, fifteen miles, thirty miles, etc.), such as for business or for commuting to and from the user's home and office. For example, many people may live in suburban areas surrounding a major city, and commute daily in and out of the city. Still further, examples herein recognize that, in some instances, users requesting services just before the time when travel is necessary (e.g., three minutes or five minutes before the transport service is needed) may result in unfulfilled services if a provider is not readily available at that time.

According to some examples, in order to improve the efficiency of the network service in matching users for shared transport (e.g., where one driver drives one or more riders traveling in an overall same direction) and to improve the user experience for those users that need to travel long distances, such as for commutes, the network computer system can use paired geographic data sets along with user-specified data to facilitate the matching process. Specifically, in one example, the network computer system can receive availability data from a class of users (e.g., providers) for various days and/or times that those users are (i) planning on traveling from a start location to an end location and (ii) willing to transport another user for at least substantially the distance that the other user needs to travel (e.g., 75% or more of the distance). The network computer system can match a user from a second class of users (e.g., requesters) with a provider based, at least in part, on an identified paired geographic data set associated with that provider and the user's specified time constraints.

In one example, providers can individually specify an availability schedule for a given day or week (or other durations of time) with sets of availability data. As referred to herein, in one example, a set of availability data can include a start location, an end location, and a time parameter(s) (e.g., a date, a start time range or duration of time, etc.). The set of availability data can also be associated with or include an identifier of the provider. Providers can individually provide input on an application (e.g., a designated application that communicates with the network computer system) running on a device to specify the availability schedule, and the application can transmit individual sets of availability data to the network computer system at a time before (or alternatively, when) the provider is available to provider shared transport.

For example, for a given week, a provider may specify that she plans to drive from her home location/address in San Francisco, Calif. to her office location/address in Palo Alto, Calif. on Monday, Wednesday, and Friday sometime between 8 am and 10 am, and similarly, plans to drive from her office back to her home on Monday and Wednesday between 5 pm and 7 pm, and Friday between 4 pm and 6 pm. The provider can provide the sets of availability data to the network computer system on Sunday before the start of the week (e.g., a set of availability data for each of the provider's plan of travel). Each set of availability data can also indicate that the provider is willing to transport a rider(s) along with her travel.

According to examples, for individual sets of availability data, the network computer system can associate the provider identifier and/or that set of availability data to a paired geographic data set ("paired data set"). In one example, for a set of availability data, the network computer system can determine whether a paired data set exists for that set of availability data in a database based, at least in part, on the start and end locations of that set of availability data. Each paired data set in a paired data set database can be associated with a first defined geographic region ("start region") and a second defined geographic region ("end region") and can be associated with a group (and/or an identifier). If the network computer system determines that the start location and the end location of a set of availability data are each located in a start region and an end region of a paired data set (e.g., based on map data), respectively, the network computer system can associate the provider of the set of availability data with the group associated with that paired data set. In some examples, the existence of a paired data set in the paired data set database can indicate that the network computing system allows for shared transport between those geographic regions as part of the network service.

The network computing system can store the received sets of availability data in a database(s) stored in a memory resource(s). In one example, the data or parameters from the set of availability data can be stored or associated with a group for the paired data set. Each set of availability data can be associated with the provider's identifier. For example, a first group for a first paired data set (having a start region of San Francisco, Calif., and an end region of Oakland, Calif.) can store data from one or more sets of availability data (e.g., each with a provider identifier, a start location, an end location, a time range, a date, and/or other data), while a second group for a second paired data set (having a start region of Palo Alto, Calif., and an end region of San Francisco, Calif.) can store data from another one or more sets of availability data.

The network computing system can receive data corresponding to requests for service (e.g., transport) from requesters that seeking a ride from one location/region to another location/region at various times, such as by joining travel with someone else. Data for the request can include a start location of the requester, the end location of the requester, a time or window of time to depart at the start location, and/or a date (and/or other data, such as an identifier of the requester, current location of the requester, device information, etc.). The network computing system can select a provider, if any, that is available to provide the service for the requester by identifying a paired data set based on the start location of the requester and the end location for the requester, and select the provider based on the time parameter of the requester and the time parameter of the provider. The network computing system can provide data to the requester device and provider device to cause the respective devices to display content about the match for the request.

Among other improvements, embodiments described herein provide for an improved database storing information relating to providers and requesters such that the providers and requesters can be algorithmically matched for the provision of the network-based service by the providers for the requesters. In more detail, embodiments provide for a particular and improved data structure—paired data sets—to be utilized in the improved database to store availability information relating to providers and requesters. In one aspect, by associating availability information with geographic location information (e.g., start and/or end locations), paired data sets allow the improved database to be utilized more efficiently in the algorithmic matching of providers and users. In particular, by using a database storing paired data sets that associate availability information with geographic location, the network system can more quickly and efficiently search or sort availability information based on geographic locations, including identifying a particular provider having availability information that matches a particular set geographic location requirements. In this manner, providers can be more efficiently identified in response to a service request from a particular requester. In another aspect, by associating availability information and time parameters, the use of paired data sets in the database enable the network system to perform the algorithmic matching of providers and requesters in a more efficient manner. For instance, in existing network systems for managing network-based services in matching providers and requesters, the matching of providers with a requester is performed immediately or shortly prior to the network-based service being performed. For example, for a service request scheduled in the future, existing network systems store the request information and perform the matching process to identify an available provider shortly or immediately before the service is to be performed. One undesirable aspect of such existing network systems is that these systems are taxed during peak times and hours when users typically request service (e.g., rush hour). In contrast, using paired data sets that associate availability information with time parameters, the improved matching process can be performed any time in advance of the requested service. In this manner, the network system can schedule the improved matching process to be performed during non-peak hours, thereby reducing hardware processing requirements needed to implement the network system.

As referred to herein, the terms "user" and "requester" are used throughout this application interchangeably to describe a person or group of people who utilize a client application on a computing device to request, over one or more networks, services from a network computing system, such as transport services. The term "provider" is used to describe a person or group of people who utilize a client application on a computing device to receive information about services to provide to a requester.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 is a block diagram illustrating an example network computer system in communication with service requester and service provider devices, in accordance with examples described herein. The network computer system 100 (or "network system 100") can implement or manage a network service that matches requesters with providers. In one example, the network system 100 can select providers to provide on-demand transport or delivery services for requesters that request such services. For example, the network service can enable services to be requested by requesters (e.g., a first class of users) and provided by providers (e.g., a second class of users) by way of a client application 175 executing on each of the requester device and a provider device. The network system 100 can enable individual requesters and providers to register with the network service in order to request services and provide services, respectively, and can store profile data for the requesters and providers (e.g., in a user database(s), not illustrated in FIG. 1 for purposes of simplicity). As used herein, a requester device and a provider device can each correspond to computing devices (referred to herein as a "user device 170" in FIG. 1 for purposes of simplicity) with functionality to execute designated applications corresponding to the network service implemented by the network system 100. Such computing devices can include mobile computing devices, such as smartphones, tablet computers, virtual reality or augmented reality headsets, on-board computing systems of vehicles, and the like. Example network services can comprise delivery of food or products, package mailing, shopping, construction, plumbing, home repair, housing or apartment sharing, etc., or can include transportation arrangement services.

The network system 100 can also enable individual providers to specify availability data for various days and/or times that the individual providers are (i) planning on traveling from a start location to an end location and (ii) willing to transport another user (e.g., a requester) for at least substantially the distance that the other user needs to travel. A provider can specify an availability schedule for a given day or week with sets of availability data, by specifying, for example, a start location, an end location, and a time parameter(s). The start location and/or the end location can correspond to an address, a location data point (e.g., a latitude and longitude coordinate), a stored location associated with the provider, a point of interest, etc. The network system 100 can associate or classify individual sets of availability data with groups based on paired data sets, can receive requests for service from requesters, and select providers for the requesters based on the paired data sets.

Referring to FIG. 1, the network system 100 can include a device interface 110 (or alternatively, a requester device interface and a provider service interface) to communicate with the client applications 175 running on the user devices 170 over one or more networks 160. Depending on implementation, requesters can operate requester-specific client applications while providers can operate provider-specific client application, or alternatively, both requesters and providers can operate client applications that include functionality for both requesting services and providing availability data for providing services. In the latter example, the user can specify whether he or she is a requester or provider when providing availability data, or the user can access a user interface from the client application 175 for providing information as a requester or a provider. In such examples, the network system 100 can process and handle the received information (e.g., set of availability data or request for service) on the basis of whether the received information is for a requester or a provider.

A provider can provide input via the client application 175 to specify a set(s) of availability data for providing transport for another user, while traveling from one location to another. The provider can specify multiple sets of availability data for a single day or for a given week or other duration of time (e.g., set a schedule). The network system 100 can receive the set(s) of availability data from the provider and the group select 120 can associate the provider identifier (ID) and/or the set(s) of availability data to a paired geographic data set (also referred to as a paired data set). In one example, for a set of availability data, the group select 120 can search a geographic data sets database ("geo data sets database") 140 for a paired data set based on the start location and the end location in the set of availability data. The geo data sets database 140 can store a plurality of paired data sets, where each data set is associated with a first geographic region (e.g., start region) and a second geographic region (e.g., end region), and each geographic region is defined by a set of location data points (e.g., a geofence)—for example, PSD1: (Reg1, Reg2); PSD2: (Reg1, Reg3); PSD3: (Reg2, Reg4); PSD4: (Reg3, Reg2); PSD5: (Reg2, Reg1), etc., where the (X, Y) corresponds to (Start Region, End Region). According to one example, the group select 120 can parse the set of availability data to determine the provider's start location and end location, access a map database 125 to determine which geographic region the start location is located in and which geographic region the end location is located in, and determine which paired data set has the corresponding start geographic region and the corresponding end geographic region.

In response to identifying the paired data set, the group select 120 can identify a group associated with that paired data set and associate the provider ID and/or the set of availability data to the group (e.g., using the group ID). The group can correspond to a list, table, or database, for example, that is stored in the group store database 150. Although FIG. 1 illustrates the geo data sets database 140 and the group store database 150 as separate databases, in other examples, the group data can be stored along with the paired data sets in a single database, such as in the geo data sets database 140. A group for a paired data set can include data, entries, or records, for example, for each set of availability data having a start location and an end location associated with that paired data set. In other words, the group store database 150 can include multiple groups for multiple paired data sets, where each group can be associated with multiple provider IDs and/or sets of availability data.

The matching subsystem 130 of the network system 100 can receive data corresponding to a request for service from a requester operating a user device 170. The data can include the requester's start location, the requester's end location, a time parameter(s), and/or other data (e.g., the requester's ID). According to an example, the matching subsystem 130 can receive the request data and determine which, if any, of the paired data sets the request data can be associated with or correspond to, based on the requester's start location being within a start region and the requester's end location being with an end region of a stored paired data set. Depending on implementation, the matching subsystem 130 can access the map database 125 and/or the geo data sets database 140 to determine which start region (of a plurality of paired data sets) the requester's start location is positioned in and which end region (of the plurality of paired data sets) the requester's end location is positioned in.

In one example, if the requester's start location and/or end location is not positioned within a respective start region and/or end region of a stored paired data set, the network system 100 can automatically transmit a notification to the requester's user device 170 to inform the requester that shared transport is not available from the requester's start location to the requester's end location. In some examples, as an addition or an alternative, the network system 100 can provide data to the requester's user device 170 to cause the client application 175 to display one or more geographic regions on a map depicting regions where shared transport (and direction of travel for shared transport) is available for the requester. The displayed region(s) can be based on the requester's current location or the requester's previously inputted request data.

If the matching subsystem 130 identifies a paired data set for the requester, in one example, the matching subsystem 130 can identify the corresponding group for the paired data set from the group store database 150 and search the group for a provider and/or the set of availability data to match with the requester. As an example, the group for the paired data set can include a set (zero, one, or more than one) of provider IDs and/or set of availability data. For example, ten different sets of availability data may have been provided to the network system 100 by one or more providers, that are each associated with a paired data set and the group. Each set of availability data in the group can be associated with a provider ID. The matching subsystem 130 can select, from the group, the provider who specified the set of availability data having a time parameter (e.g., date and/or time range) that satisfies the requester's time parameter.

Depending on implementation, the provider's time parameter (from the set of availability data) can match the requester's time parameter (from the request data), or can satisfy the time constraint, if the provider's date of the set of availability data matches the requester's date (e.g., the date of the submitted request data) and/or if the provider's time range at least partially overlaps or matches the requester's time range. As examples, the time constraint for a set of availability data is satisfied for any of these conditions if the provider's time range is from 8 am to 10 am: the requester's time range is from 8:30 am to 9 am, or 7 am to 8 am, or 7 am to 11 am, or 10 am to 11 am. If the matching subsystem 130 identifies a set of availability data for the requester, the matching subsystem 130 can select the respective provider and transmit data about the match to each of the requester user device 170 and the provider user device 170.

In some examples, the matching subsystem 130 can identify multiple sets of availability data that satisfies the request data's constraints (e.g., more than one provider can provide the service for the requester—in other words, there are multiple candidate providers for the requester). In such an example, the matching subsystem 130 can identify the provider to select (or rank the candidate providers and select the highest ranked candidate provider) based, at least in part, on (i) an inconvenience score for that provider in picking up and dropping off the requester (where a lower inconvenience score for that provider results in a higher ranking) and/or (ii) a time score for that provider and the requester based on the respective time parameters. According to examples, an inconvenience score for a candidate provider can be based on (i) an estimated duration of time and/or distance of travel that candidate provider has to travel from that candidate provider's start location to the requester's start location, and/or (ii) an estimated duration of time and/or distance of travel that candidate provider has to travel from the requester's end location to that candidate provider's end location, and/or (iii) an estimated duration of time and/or distance of travel that that candidate provider and requester travels together on the shared transport. Still further, in one example, a time score for a candidate provider and the requester can be based on the duration of overlapping time of the respective start time windows (e.g., if the duration is greater, the time score can be greater). As an addition or an alternative, a candidate provider can be given more weight in selection or ranking based on whether that candidate provider has previously provided share transport for the requester and/or whether that candidate provider and the requester both gave each other high feedback or rating.

If the matching subsystem 130 selects the provider to provide the shared transport for the requester, for example, the matching subsystem 130 can transmit, to the provider user device 170, data corresponding to an invitation to accept or reject service to provide transport for the requester. The provider can operate the client application 175, which displays a user interface for the invitation (including information about the requester, such as the name and/or image, the requester's start location, the requester's end location, the requester's time parameter), and can choose to accept or reject the invitation. In one example, the provider can further select a start time or smaller time window (within the requester's time window) along with the acceptance. The network system 100 can receive data for the acceptance or rejection. If the provider accepts, the network system 100 can provide a notification to the requester's user device 170 to inform the requester that the provider will provide shared transport for the requester and in one example, can include the specified start time or smaller time window selected by the provider. If the provider rejects, the matching subsystem 130 can determine another provider from the group associated with the paired data set, if any, to fulfill the request.

According to examples, if the matching subsystem 130 does not find a set of availability data for the requester because the time constraint is not satisfied, the network system 100 can continue to inform or periodically inform (by providing data to the client application 175) the requester that it is still searching for a provider. During this time, the network system 100 can continue to receive sets of availability data from other providers (or from providers that have already provided sets of availability data) and associate the sets of availability data to groups in the group store database 150. The network system 100 can continue to attempt to match a provider for the requester until a time before the requester's request date and time. For example, the network system 100 can continue to attempt to match a provider for the requester until a predetermined time before the date and time (e.g., eight hours before) or at a certain time the day before the requested date (e.g., 9 pm the previous day), and if no match is found by this time, the network system 100 can notify the requester.

While an example of FIG. 1 has been described with respect to matching an individual requester with a provider, in some examples, the matching subsystem 130 can perform a group selection process for multiple requesters and multiple providers. As described, in many instances, requesters and providers can submit request data and sets of availability data, respectively, at a time before the shared transport (e.g., hours before or days before, etc.). As such, the network system 100 can group request data together based on paired data sets, and perform a group selection process. Providers associated with a paired data set can be grouped together for a given time period (e.g., morning, afternoon, evening), and requesters associated with the paired data set can be grouped together. The matching subsystem 130 can then assign providers to requesters of that paired data set while satisfying the time constraints (based on the time parameters) and while reducing the collective inconvenience score as a whole for the providers.

When a shared transport is matched for the requester and provider, the matching subsystem 130 can associate a record for the shared transport (e.g., stored in a database, such as a trip database) with the requester ID, the provider ID, and details about the shared transport (start location(s), end location(s), start time or time window, and/or other data). When the start time approaches for the matched shared transport, the network system 100 can notify the requester and provider. For example, the network system 100 can include a messaging or notification service (not illustrated in FIG. 1 for purposes of simplicity) that automatically generates and transmits a notification to the user devices 170 of the requester and provider. The messaging service can notify the provider, for example, at a predetermined time(s) before the date and/or time of the service (e.g., one day before, the night before at a specified time, and/or an hour before as a reminder, etc.). Similarly, the messaging service can notify the requester at a predetermined time(s) before the date and/or time of the service and/or when the provider has indicated via the client application 175 that he or she has started the shared transport. As an addition or an alternative, the messaging service can notify the requester when the provider has left his or her start location or indicated that the provider has started the service, and/or when the provider is traveling to the requester's start location.

Depending on implementation, the shared transport can be initiated by the provider when the provider provides input on the client application 175. For example, the provider gets into his or her vehicle near the start time and selects a "start" feature on the client application, or the provider provides the input when the provider gets to the requester's start location. Alternatively, the network system 100 can track the position of the provider starting at a predetermined time before the start time of the service, and determine whether the provider has left the vicinity of the provider's start location. If yes, the network system 100 can programmatically determine that the service has been initiated.

The network system 100 can include a tracking component (not illustrated in FIG. 1 for purposes of simplicity) that periodically tracks the position of the provider's user device 170 and the state of the service (e.g., whether the provider has arrived at the requester's start location, whether the provider has indicated that the requester has been picked up, whether the provider has indicated that the requester has been dropped off, etc.). In some implementations, the provider's user device 170 can determine the current location using location-based resources of the user device 170 (e.g., global positioning system (GPS) resources). In some examples, the client application 175 can update the state of the provider or the service in response to provider input to the service provider device 180, location changes determined by GPS, or service steps performed, etc. The tracking component can store or associate the location information periodically received from the provider's user device 170 (or additionally or alternatively, the location information periodically received from the requester's user device 170) and/or state information (along with the time information or timestamps) of the provider with the record for the service.

Still further, the network system 100 can determine an amount for the service that the requester is to pay. Depending on implementation, the network system 100 can determine an amount before the service is matched, after the service is matched, or after the service is completed (e.g., completion can be when the requester is dropped off at the requester's end location or somewhere nearby within a predetermined distance, or when the provider gets to the provider's end location or somewhere nearby). The amount can be computed based, at least in part, on an actual (or estimated) duration of time and/or distance for the service (estimated duration of time and/or distance can be used for determined amounts before the service is matched or after the service is matched but before completion of the service) and/or other factors, such as tolls or other pricing data, where the actual (or estimated) duration of time and/or distance can include (i) the actual (or estimated) time and/or distance from the provider's start location to the requester's start location, (ii) the actual (or estimated) time and/or distance from the requester's start location to the requester's end location, and/or (iii) the actual (or estimated) time and/or distance from the requester's end location to the provider's end location. The network system 100 can facilitate receipt of the amount from the requester using the requester's payment method and payment of at least a portion of the amount to the provider (e.g., using payment services, for example, not illustrated in FIG. 1 for purposes of simplicity).

Methodology

Figure 2:
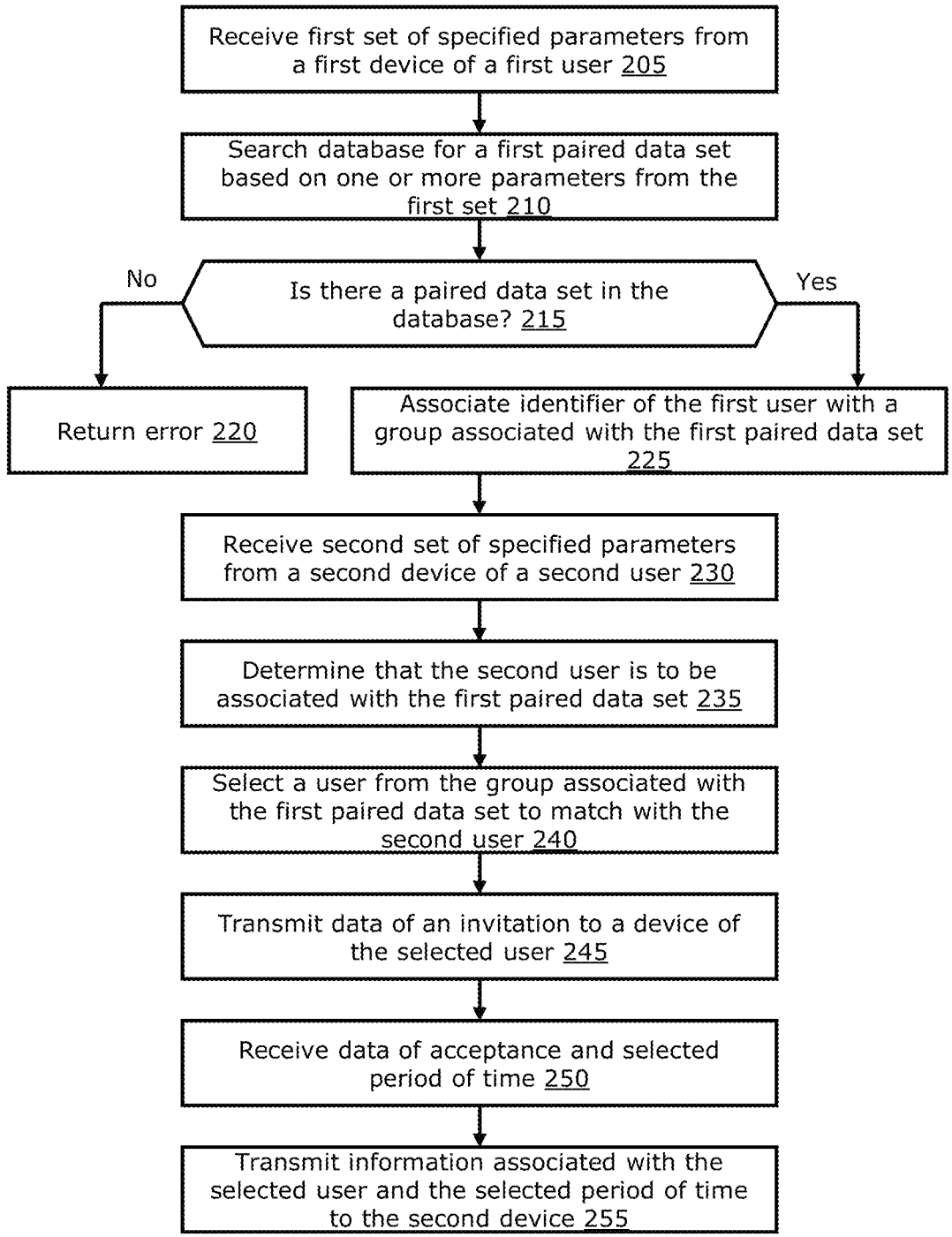
FIG. 2 is a flow chart describing an example method of operating a network service for associating identifiers of users.
Figure 3:
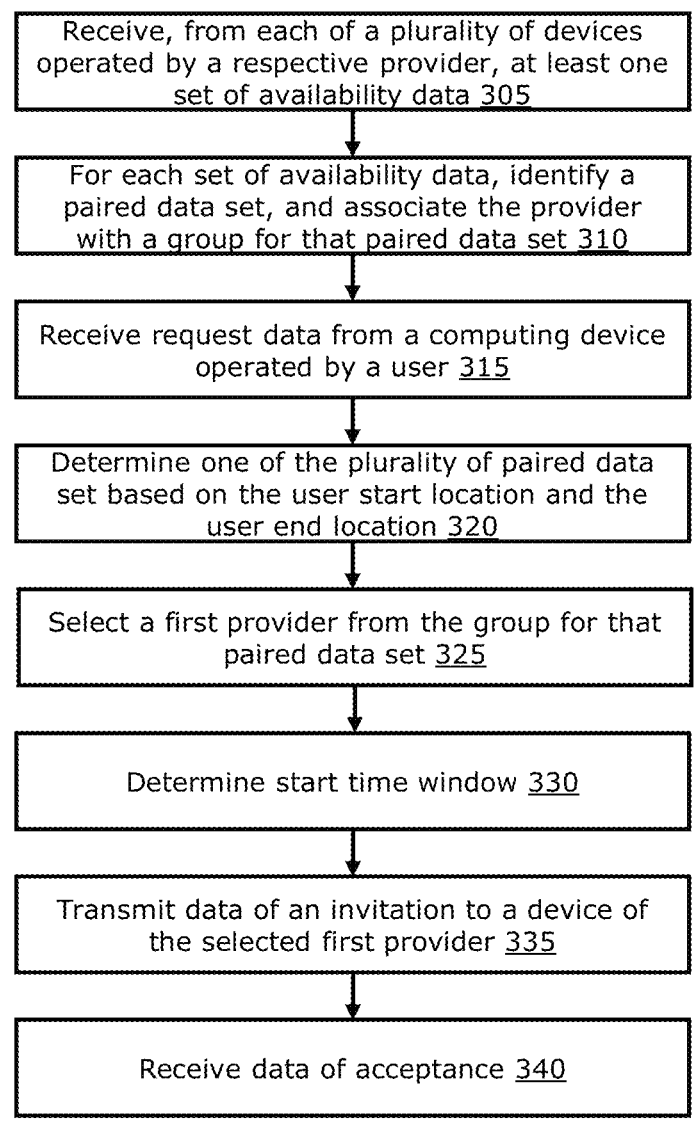
FIG. 3 is a flow chart describing another example method of operating a network service for associating identifiers of users.

FIG. 2 is a flow chart describing an example method of operating a network service for associating identifiers of users. FIG. 3 is a flow chart describing another example method of operating a network service for associating identifiers of users. While operations of the methods are described below as being performed by components of the network system 100, it will be appreciated that these operations need not necessarily be performed by the specific components identified, and could be performed by a variety of components and modules, potentially distributed over a number of machines. Accordingly, references may be made to elements of the network system 100 for the purpose of illustrating suitable components or elements for performing a step or sub step being described. Alternatively, at least certain ones of the variety of components and modules described in the network system 100 can be arranged within a single hardware, software, or firmware component. It will also be appreciated that some of the steps of these methods may be performed in parallel or in a different order than illustrated.

FIG. 3 is a flow chart describing an example method of operating a network service for associating identifiers of users using paired data sets, according to examples described herein. The network system 100 can receive, over one or more networks from a first user device 170 operated by a first user (e.g., a provider), data corresponding to a first set of specified parameters, also referred to herein as a set of availability data (205). The first set of specified parameters can include a provider ID, a start location, an end location, and a time parameter (or time window) for the provider. The network system 100 can search one or more databases for a first paired data set based on the start location and the end location (210).

Figure 4:
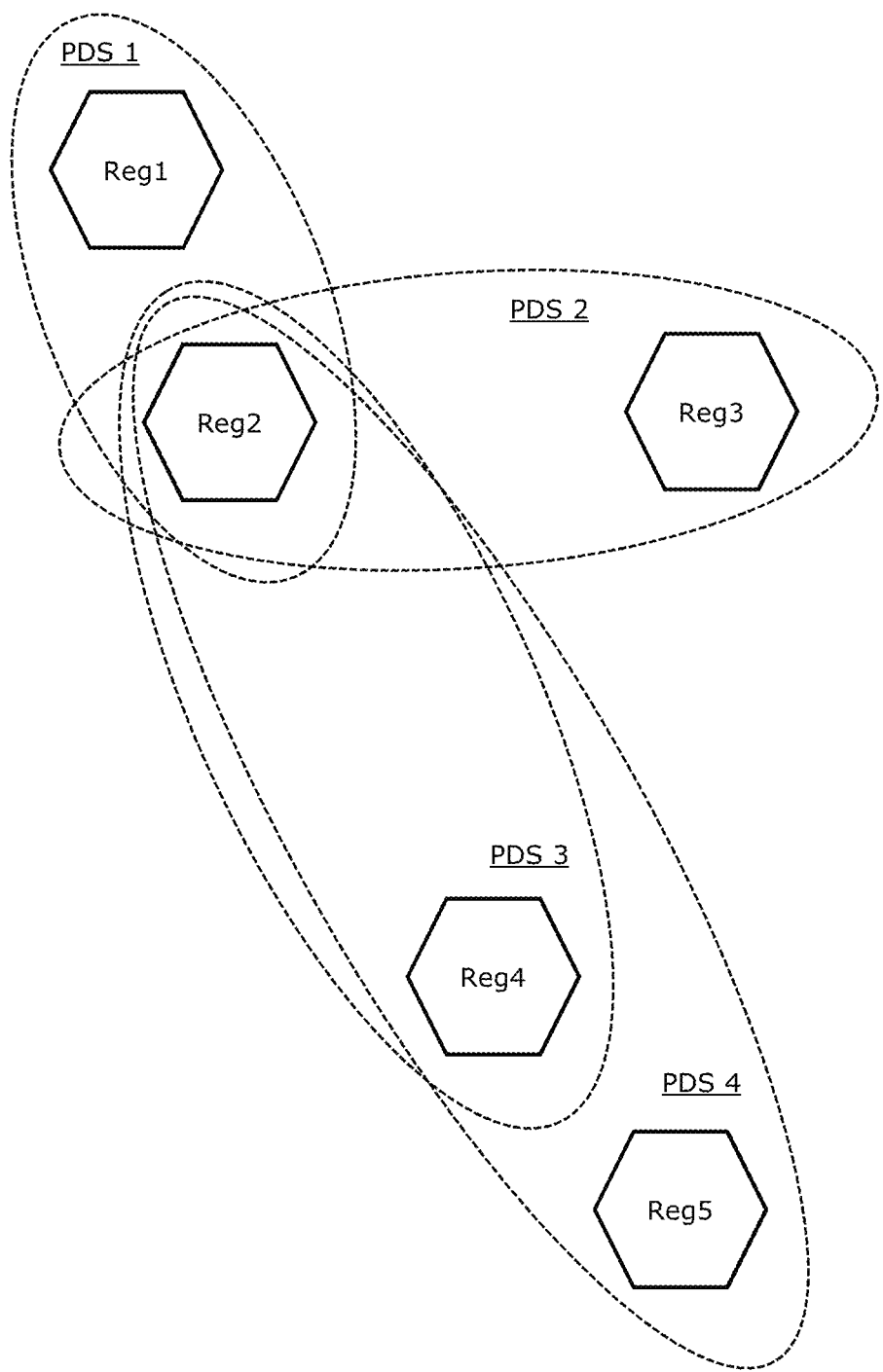
FIG. 4 is an illustration depicting geographic regions and paired data sets, according to examples described herein.

For example, FIG. 4 is an illustration depicting geographic regions and paired data sets, according to examples described herein. Referring to the example of FIG. 1, the geo data sets database 140, for example, can store information about the paired data sets, such as paired data set 1 (PDS 1), PDS 2, PDS 3, PDS 4, where each paired data set is associated with a pair of geographic regions (start region, end region). PDS 1 can be associated with Reg2 (start region) and Reg1 (end region), PDS 2 can be associated with Reg3 (start region) and Reg2 (end region), PDS 3 can be associated with Reg2 (start region) and Reg4 (end region), and PDS 4 can be associated with Reg2 (start region) and Reg5 (end region). The geo data sets database 140 can store additional paired data sets, but only four paired data sets are illustrated in FIG. 4 for purposes of simplicity.

Referring back to FIG. 2, the network system 100 can determine which start region the provider's start location is positioned in and which end region the provider's end region is positioned in (e.g., such as by using map data and comparing with the geographic regions). Based on this search, the network system 100 can determine whether a paired data set exists (210). If no, the network system 100 can return an error to the provider, in one embodiment (220). If a paired data set is found for the provider, such as PDS 2, for example, the network system 100 can associate the provider ID (and/or the set of parameters) with a group associated with the paired data set (225). The group can include other provider IDs for those providers, if any, who also provided sets of specified parameters that are associated with the paired data set based on the respective providers' start and end locations. Depending on implementation, in some examples, a group can be associated with a paired data set or can be organized as sub-groups based on time (e.g., a first sub-group for a first paired data set for those providers who indicated morning travel, a second sub-group for the first paired data set for those providers who indicated early afternoon travel, a third sub-group for the first paired data set for those providers who indicated late afternoon travel, etc.).

The network system 100 can also receive, over one or more networks from a second user device 170 operated by a second user (e.g., a requester), data corresponding to a second set of specified parameters, also referred to herein as a request data (230). The second set of specified parameters can include a requester ID, a start location, an end location, and a time parameter (or time window) for the requester. The network system 100 can determine which paired data set, if any, the request data is to be associated with for purposes of matching the requester with a provider. For example, the network system 100 can determine which start region the requester's start location is positioned in and which end region the requester's end region is positioned in. In the example of FIG. 2, the network system 100 can determine that the requester is to be associated with PDS 2 (235).

The network system 100 can select, from the group associated with the paired data set (e.g., the group for PDS 2), a provider to match with the requester based, at least in part, on the requester's time parameter and the providers' time parameters in the group (240). For example, the group for PDS 2 can include twelve provider IDs and/or sets of availability data. Based on the time parameter specified by the requester (e.g., a time range), the network system 100 can identify one or more providers that have specified a time parameter that at least partially overlaps the time parameter of the requester. Depending on implementation, if multiple providers of the group satisfy the time constraint (e.g., and are candidate providers that can be matched with the requester), the network system 100 can rank the providers, such as described in FIG. 1, and select the top ranked provider to invite.

According to one example, the network system 100 can determine a communication identifier for the selected provider, such as the device identifier or phone number (e.g., from a database), and transmit, to the selected provider's user device 170, data corresponding to an invitation to provide service for the requester (245). The data can cause the client application 175 of the provider's user device 170 to display a user interface that includes details about the proposed service the provider is to provide for the requester and one or more selectable features to accept or decline the invitation. The requester can accept the invitation or decline the invitation by providing input on the user interface. The provider's user device 170 can transmit data about the acceptance or rejection to the network system 100. Based on whether the provider accepted or rejected, the network system 100 can programmatically perform additional operations to notify the requester and/or the provider, such as described in the example of FIG. 1.

Figure 5:
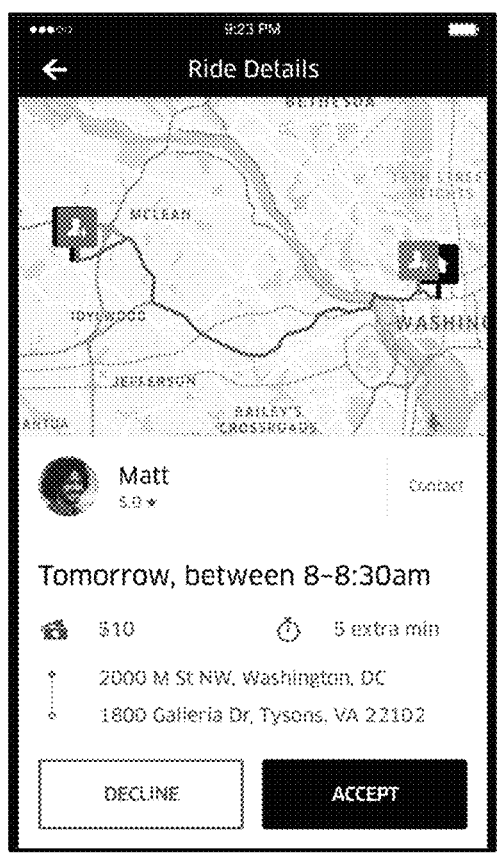
FIGS. 5 and 6 illustrate example user interfaces of a designated client application, according to examples described herein.

An example of the invitation user interface is illustrated in FIG. 5, which can be presented by the client application 175 of the provider's user device 170. The user interface can include a map portion that depicts the provider's specified start and end locations (using graphic indicators), the requester's specified start and end locations, and a route of travel from the provider's start location to the requester's start location, the requester's start location to the requester's end location, and requester's end location to the provider's end location. In the example of FIG. 5, the graphic indicators showing the provider's start and end locations are partially hidden from view due to the close proximity of the requester's start and end locations (shown by indicators) to the provider's start and end locations, respectively. The user interface can also include an information panel that displays a variety of information, including, for example, the requester's name, image, rating ("5.0" stars out of 5 stars), a selectable link to enable the provider to contact the requester ("contact" feature), and the service information. The service information can include the date (and/or other date indicator based on the date, such as "today" or "tomorrow," such as illustrated in FIG. 5) of the service, the service window of time in which to pick up the requester, the requester's start location ("2000 M St. NW, Washington, D.C."), the requester's end location ("1800 Galleria Dr, Tysons, Va. 22102"), the amount to be paid or received, and the amount of estimated time added to the provider's travel by servicing the requester. The information panel can also include a feature to accept the service and a feature to decline the service.

Still further, in another example, the user interface can display a feature to enable the provider to select a time window in which to further specify the start time for service. For example, the provider may have indicated, in the set of availability data, the time window of 7:00 am to 8:30 am, while the requester may have indicated, in the request data, the time window of 7 am to 9 am. The user interface can display a feature to enable the provider to select from a variety of start time windows based on the time parameters (e.g., a scroll bar or selection menu that that provider can select from: "7:00-7:15 am," "7:15 am-7:30 am," "7:30 am-7:45 am," "7:45 am-8:00 am," "8:00 am-8:15 am," and "8:15 am-8:30 am"). The provider can select one of the start time windows (e.g., "8:00 am-8:15 am") and can then select the accept feature. Referring back to FIG. 2, for example, when the provider selects the start time window and accepts the feature, the provider's user device 170 can transmit data about the acceptance and the further specified start time window to the network system 100, and the network system 100 can receive such data (250). The network system 100 can transmit information to the requester's user device 170 notifying the user that the provider will be provide service for the requester and will pick up the provider at the specified start time window (255). The information transmitted can include provider information, such as the provider's name, vehicle type, rating, image, etc., which can be displayed in the client application 175 of the requester's user device 170.

Figure 6:
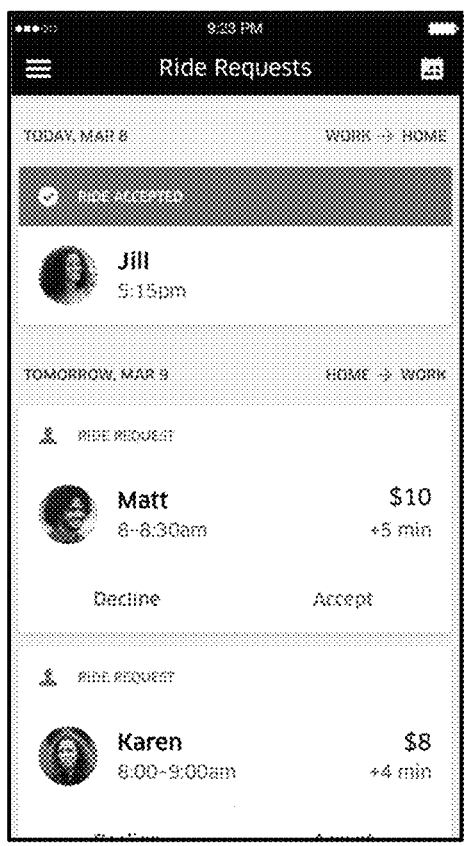

According to some examples, the provider's client application 175 can also display a service request user interface that includes individual information panels about services that the provider has been invited to provide and/or services that the provider has accepted to provide. An example of the service request user interface is illustrated in FIG. 6. In one example, the service request user interface can organize the information panels in a way to depict those services that the provider has been invited to provide and/or has accepted in an order based on time. For example, in FIG. 6, the first information panel can display the service for the current day (Today, March 8), which depicts the requester (Jill), the start time (5:15 pm, in this example, a single selected time as opposed to a start time window), and an indicator that the service has been accepted by the provider. The information panel can also display the start and end locations of the provider for the particular service (e.g., Work location to Home location). The second and third information panels in the example of FIG. 6 depicts two requests that are open invitations (or have not yet been accepted or declined by the provider). The information panels for the open invitations can include additional data, such as the amount the provider can earn as well as the amount of additional time estimated to be added to the provider's travel. In some examples, if the provider selects the information panel (such as the second information panel for transporting Matt), such as by tapping on the information panel, the client application 175 can display the detailed invitation user interface, such as the user interface in FIG. 5.

Still further, in one example, the provider can receive multiple invitations from the network system 100. As depicted in the example of FIG. 6, the provider has received two invitations to provide service for requesters on the provider's travel from the Home location to the Work location for the same day (March 9). The provider can choose to decline both, accept one, or accept both (in some examples). In one example, the network system 100 can send multiple invitations to a provider if the paired data sets and time parameters for both requesters can be matched by the provider (and/or provided that the inconvenience score is not greater than a threshold score for the provider when providing both services, e.g., based on the time and/or duration of travel to pick up both requesters and drop off both requesters). In this example, the start locations and end locations of the requesters are such that the provider would be capable of picking up Matt between 8 to 8:30 am, then pick up Karen after before 9 am.

FIG. 3 is a flow chart describing another example method of operating a network service for associating identifiers of users using paired data sets, in one embodiment. In some examples, one or more steps of FIG. 3 can be performed in conjunction with or in place of one or more steps of FIG. 2. The network system 100 can receive, over one or more networks from each of a plurality of devices 170 operated by a provider, at least one set of availability data (305). For each set of availability data, the network system 100 can identify a paired data set based on the start location and the end location of that set of availability data, and associate the provider with a group for that paired data set (310). The network system 100 can also receive, over one or more networks from a user device 170 operated by a requester, request data (315). The network system 100 can determine a paired data set based on which start region the requester's start location is positioned in and which end region the requester's end region is positioned in (320).

The network system 100 can identify the group associated with the paired data set and select a first provider from the group to match with the requester based, at least in part, on the requester's time parameter and the providers' time parameters in the group (325). For example, the group can include twenty provider IDs and/or sets of availability data. Based on the time parameter specified by the requester (e.g., a time range), the network system 100 can identify one or more providers that have specified a time parameter that at least partially overlaps the time parameter of the requester. Depending on implementation, if multiple providers of the group satisfy the time constraint (e.g., and are candidate providers that can be matched with the requester), the network system 100 can rank the providers and select the top ranked provider to invite.

In some examples, the network system 100 can determine a start time window based on the provider's specified time window and/or based on the requester's specified time window (330). For example, the provider may have indicated, in the set of availability data, the time window of 7:30 am to 8:30 am, while the requester may have indicated, in the request data, the time window of 8 am to 9 am. As an addition or an alternative, the network system 100 can determine the service time window in other programmatic ways, such as by picking the earliest predetermined duration of time (e.g., 30 minutes) when the provider and requester's time window overlap, the latest predetermined duration of time when the provider and requester's time window overlap, or a predetermined duration of time in the median or middle of the time when the provider and requester's time window overlap. In one example, referring back to FIG. 2, the network system 100 can determine an initial start time window (e.g., to provide as part of the invitation) and then subsequently enable the provider to further specify the start time window. The network system 100 can transmit invitation that includes the determined start time window to the selected provider (335). If the provider accepts the service, the network system 100 can receive data of the acceptance (340).

Hardware Diagrams

Figure 7:
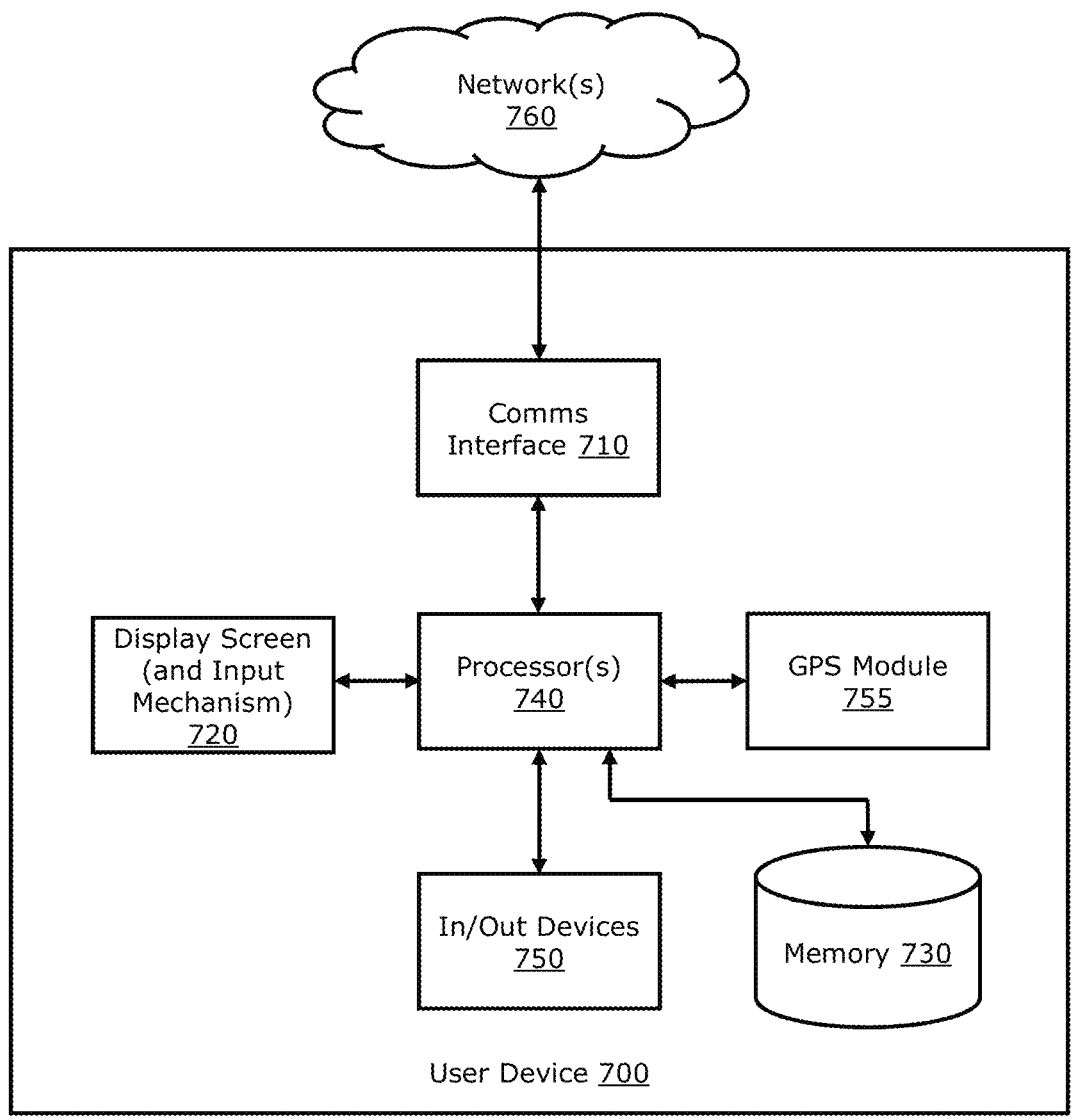
FIG. 7 is a block diagram illustrating an example client device executing a designated client application, according to examples described herein.

FIG. 7 is a block diagram illustrating an example client device executing a designated client application, according to examples described herein. In many implementations, the user device 700 can comprise a mobile computing device, such as a smartphone, tablet computer, laptop computer, VR or AR headset device, and the like. As such, the user device 700 can include typical telephony features such as input/output devices 750 (e.g., microphone, camera, speakers, etc.) and a communication interface 710 to communicate with external entities using any number of wireless communication protocols over one or more networks 760. In certain aspects, the user device 700 can store a designated client application (e.g., a requester or provider application) in a local memory 730. The memory 730 can store additional applications executable by one or more processors 740 of the user device 700, enabling access and interaction with one or more host servers over one or more networks 760.

In response to a user input, the client application can be executed by a processor 740, which can cause an application user interface to be generated on a display screen 720 of the user device 700. The application user interface, such as for a provider, can enable a provider to submit a set of availability data for the network service, for example. As provided herein, the client application can further enable a communication link with a network computer system over the network 760, such as the network computer system 100 as shown and described with respect to FIG. 1. Furthermore, as discussed herein, the client application can display requester information, such as a part of an invitation user interface, so that the provider can choose whether to accept or reject a service invitation received from the network computer system.

For a provider's user device 700, the processor 740 can transmit the provider status and other provider information via a communications interface 710 to the network computer system over a network 760. In various examples, the user device 700 can further include a GPS module 755, which can provide location data indicating the current location of the provider to the network computer system (e.g., to track the provider). In alternative aspects, hard-wired circuitry may be used in place of or in combination with software instructions to implement aspects described herein. Thus, aspects described are not limited to any specific combination of hardware circuitry and software.

Figure 8:
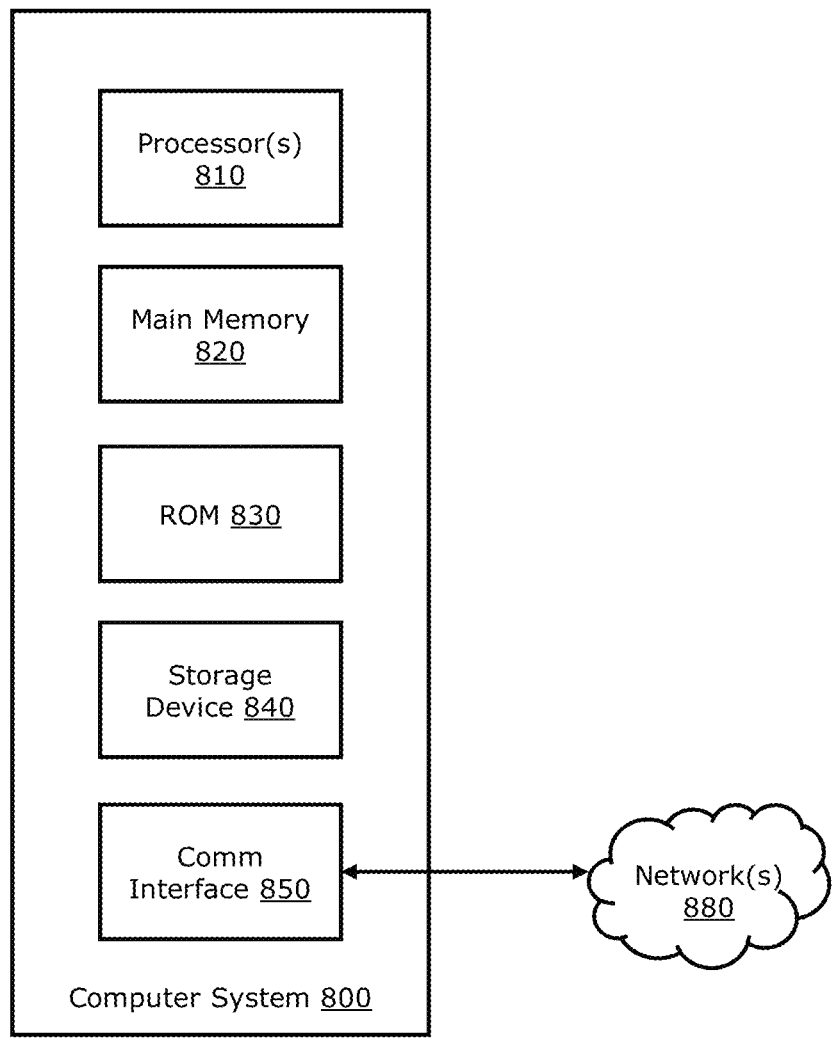
FIG. 8 is a block diagram that illustrates a computer system upon which aspects described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service for providing service services. In the context of FIG. 1, the network computer system 100 may be implemented using a computer system 800 such as described by FIG. 8. The network computer system 100 may also be implemented using a combination of multiple computer systems as described in connection with FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions, such as instructions for performing operations and data described in FIGS. 1 through 7.

The communication interface 850 enables the computer system 800 to communicate with one or more networks 880 (e.g., cellular network) through use of the network link (wireless or wired). Using the network link, the computer system 800 can communicate with one or more computing devices, such as one or more user devices, and/or one or more servers. In accordance with examples, the computer system 800 receives sets of availability data and/or request data from mobile computing devices of individual users (requesters and providers). By way of example, the instructions and data stored in the memory 820 can be executed by the processor 810 to implement an example network computer system 100 of FIG. 1. In performing the operations, the processor 810 can receive data from user devices and use paired geographic data sets to facilitate fulfillment of services. The processor 810 is configured with software and/or other logic to perform one or more processes, steps and other functions described with implementations, such as described by FIGS. 1 through 7, and elsewhere in the present application.

Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A method of operating a network system, comprising:
maintaining a plurality of paired geographic data sets in one or more databases in a memory resource, wherein the plurality of paired geographic data sets includes a first paired geographic data set associated with a first start geographic region, a first end geographic region, and a first group of service providers each having associated availability data that relates to the first start geographic region and the first end geographic region;
receiving, over one or more networks from a first device operated by a first service provider, a set of availability data that indicates a provider start location, a provider end location, and a service provider time parameter;
in response to receiving the set of availability data of the first service provider, associating the first service provider with the first paired geographic data set by: (i) searching the one or more databases in the memory resource to identify the first paired geographic data set from the plurality of paired geographic data sets based on determining that the provider start location of the first service provider is located within the first start geographic region associated the first paired geographic data set and the provider end location of the first service provider is located within the first end geographic region associated with the first paired geographic data set, and (ii) in response to identifying the first paired geographic data set for the first service provider, associating the first service provider with the first group of service providers associated with the first paired geographic data set;
receiving, over the one or more networks from a second device operated by a requester, a set of request data that indicates a requester start location, a requester end location, and a requester time parameter;

identifying the first service provider for the requester in response to receiving the set of request data of the requester by: (i) identifying the first paired geographic data set from the plurality of paired geographic data sets based on determining that the requester start location is located within the first start geographic region associated with the first paired geographic data set and that the requester end location is located within the first end geographic region associated with the first paired geographic data set, and (ii) in response to identifying the first paired geographic data set for the requester, identifying the first service provider from the first group of service providers associated with the first paired geographic data set based on determining that the service provider time parameter of the first service provider satisfies a time constraint in comparison to the requester time parameter; and in response to identifying the first service provider for the requester, transmitting to the first device operated by the first service provider an invitation to provide transport for the requester.

2. The method of claim 1, wherein the service provider time parameter of the first service provider corresponds to a start time, an end time, a start time range, or an end time range.

3. The method of claim 1, wherein receiving the set of availability data includes communicating with a first designated client application operating on the first device of the first service provider, wherein receiving the set of request data includes communicating with a second designated client application operating on the second device of the requester, and wherein the first designated client application and the second designated client application are of different types.

4. The method of claim 1, wherein the set of availability data includes a service parameter indicating that the first service provider is associated with a service provider user type.

5. The method of claim 4, wherein searching the one or more databases for the first paired geographic data set and associating the first service provider with the first group of service providers associated with the first paired geographic data set is performed in response to the service parameter indicating that the first service provider is associated with the service provider user type.

6. The method of claim 4, wherein the set of request data includes a service parameter indicating that the requester is associated with a requester user type, and wherein determining that the requester start location is located within the first start geographic region of the first paired geographic data set is performed in response to the service parameter of the set of request data indicating that the requester is associated with the requester user type.

7. The method of claim 1, wherein the service provider time parameter of the set of availability data of the first service provider corresponds to a first start time range, wherein each of one or more other service providers in the first group of service providers is associated with a respective start time range, and wherein the requester time parameter of the set of request data corresponds to a second time range.

8. The method of claim 7, wherein identifying the first service provider from the first group of service providers associated with the first paired geographic data set includes (i) identifying a set of one or more service providers from the first group of service providers based on the one or more service providers having associated start time ranges that at least partially overlap with the second time range associated with the requester, (ii) for each service provider of the identified set, computing a score based, at least in part, on the requester start location and the requester end location, and (iii) and selecting a service provider based on the score.

9. The method of claim 8, wherein, for each service provider of the identified set, computing the score includes computing at least a distance-based score or a time-based score based on the provider start location of that service provider and the requester start location and the provider end location of that service provider and the requester end location.

10. The method of claim 1, further comprising:
receiving, from the first device associated with the first service provider, data corresponding to an acceptance of the invitation to provide transport for the requester and a selected period of time.

11. The method of claim 10, further comprising:
transmitting, to the second device associated with the requester, information associated with the first service provider and data corresponding to the selected period of time.

12. A network system comprising:
one or more processors;
one or more memory resources storing instructions that, when executed by the one or more processors, cause the network system to:
maintain a plurality of paired geographic data sets in one or more databases in a memory resource, wherein the plurality of paired geographic data sets includes a first paired geographic data set associated with a first start geographic region, a first end geographic region, and a first group of service providers each having associated availability data that relates to the first start geographic region and the first end geographic region,
receive, over one or more networks from a first device operated by a first service provider, a set of availability data that indicates a provider start location, a provider end location, and a service provider time parameter;
in response to receiving the set of availability data of the first service provider, associate the first service provider with the first paired geographic data set by: (i) searching the one or more databases in the memory resource to identify the first paired geographic data set from the plurality of paired geographic data sets based on determining that the provider start location of the first service provider is located within the first start geographic region associated the first paired geographic data set and the provider end location of the first service provider is located within the first end geographic region associated with the first paired geographic data set, and (ii) in response to identifying the first paired geographic data set for the first service provider, associating the first service provider with the first group of service providers associated with the first paired geographic data set;
receive, over the one or more networks from a second device operated by a requester, a set of request data that indicates a requester start location, a requester end location, and a requester time parameter;
identify the first service provider for the requester in response to receiving the set of request data of the requester by: (i) identifying the first paired geographic data set from the plurality of paired geographic data sets based on determining that the requester start location is located within the first start geographic region associated with the first paired geographic data set and that the requester end location is located within the first end geographic region associated with the first paired geographic data set, and (ii) in response to identifying the first paired geographic data set for the requester, identifying the first service provider from the first group of service providers associated with the first paired geographic data set based on determining that the service provider time parameter of the first service provider satisfies a time constraint in comparison to the requester time parameter; and in response to identifying the first service provider for the requester, transmit to the first device operated by the first service provider an invitation to provide transport for the requester.

13. The network system of claim 12, wherein the service provider time parameter of the first service provider corresponds to a start time, an end time, a start time range, or an end time range.

14. The network system of claim 12, wherein receiving the set of availability data includes communicating with a first designated client application operating on the first device of the first service provider, wherein receiving the set of request data includes communicating with a second designated client application operating on the second device of the requester, and wherein the first designated client application and the second designated client application are of different types.

15. The network system of claim 12, wherein the set of availability data includes a service parameter indicating that the first service provider is associated with a service provider user type.

16. The network system of claim 15, wherein searching the one or more databases for the first paired geographic data set and associating the first service provider with the first group of service providers associated with the first paired geographic data set is performed in response to the service parameter indicating that the first service provider is associated with the service provider user type.

17. The network system of claim 15, wherein the set of request data includes a service parameter indicating that the requester is associated with a requester user type, and wherein determining that the requester start location is located within the first start geographic region of the first paired geographic data set is performed in response to the service parameter of the set of request data indicating that the requester is associated with the requester user type.

18. A non-transitory computer-readable medium storing instructions that, when executed by one or more processors of a network system, cause the network system to:

maintain a plurality of paired geographic data sets in one or more databases in a memory resource, wherein the plurality of paired geographic data sets includes a first paired geographic data set associated with a first start geographic region, a first end geographic region, and a first group of service providers each having associated availability data that relates to the first start geographic region and the first end geographic region;

receive, over one or more networks from a first device operated by a first service provider, a set of availability data that indicates a provider start location, a provider end location, and a service provider time parameter;

in response to receiving the set of availability data of the first service provider, associate the first service provider with the first paired geographic data set by: (i) searching the one or more databases in the memory resource to identify the first paired geographic data set from the plurality of paired geographic data sets based on determining that the provider start location of the first service provider is located within the first start geographic region associated the first paired geographic data set and the provider end location of the first service provider is located within the first end geographic region associated with the first paired geographic data set, and (ii) in response to identifying the first paired geographic data set for the first service provider, associating the first service provider with the first group of service providers associated with the first paired geographic data set;

receive, over the one or more networks from a second device operated by a requester, a set of request data that indicates requester start location, a requester end location, and a requester time parameter;

identify the first service provider for the requester in response to receiving the set of request data of the requester by: (i) identifying the first paired geographic data set from the plurality of paired geographic data sets based on determining that the requester start location is located within the first start geographic region associated with the first paired geographic data set and that the requester end location is located within the first end geographic region associated with the first paired geographic data set, and (ii) in response to identifying the first paired geographic data set for the requester, identifying the first service provider from the first group of service providers associated with the first paired geographic data set based on determining that the service provider time parameter of the first service provider satisfies a time constraint in comparison to the requester time parameter; and in response to identifying the first service provider for the requester, transmit to the first device operated by the first service provider an invitation to provide transport for the requester.

19. The non-transitory computer-readable medium of claim 18, wherein the service provider time parameter of the first service provider corresponds to a start time, an end time, a start time range, or an end time range.

20. The non-transitory computer-readable medium of claim 18, wherein receiving the set of availability data includes communicating with a first designated client application operating on the first device of the first service provider, wherein receiving the set of request data includes communicating with a second designated client application operating on the second device of the requester, and wherein the first designated client application and the second designated client application are of different types.

* * * * *